United States Patent [19]
Lavan et al.

[11] Patent Number: 4,960,990
[45] Date of Patent: Oct. 2, 1990

[54] NON COHERENT PHOTONEUTRALIZER

[75] Inventors: Michael J. Lavan; George R. Edlin; Daniel L. Whitener, all of Huntsville, Ala.

[73] Assignee: The United States of America as represented by the Secretary of the Army, Washington, D.C.

[21] Appl. No.: 456,900

[22] Filed: Dec. 26, 1989

[51] Int. Cl.[5] .................... H01S 3/0915
[52] U.S. Cl. .................... 250/251; 250/423 P; 376/130
[58] Field of Search .................... 250/251, 423 P; 376/130

[56] References Cited

U.S. PATENT DOCUMENTS 3,558,877 1/1971 Dressman .................... 250/251
4,617,462 10/1986 Holt .................... 376/130
4,837,440 6/1989 Burtscher et al. .................... 250/423 P

OTHER PUBLICATIONS

"Photodetachment Now" by Joel H. Fink; pp. 1–4.
"Performance Estimates of Photoneutralized Negative–Ion Beans" by Joel H. Fink; Fusion Technology, vol. 6, Nov. 1984, pp. 548–552.

*Primary Examiner*—Jack I. Berman
*Assistant Examiner*—Kiet T. Nguyen
*Attorney, Agent, or Firm*—Freddie M. Bush; James T. Deaton

[57] ABSTRACT

A non-coherent photoneutralizer that has a fluorescent light source for neutralizing a negative ion beam as it is passed through a housing in which the fluorescent light source is mounted.

5 Claims, 1 Drawing Sheet

NON COHERENT PHOTONEUTRALIZER

DEDICATORY CLAUSE

The invention described herein may be manufactured, used, and/or licensed by or for the Government for governmental purposes without the payment to us of any royalties thereon.

BACKGROUND OF THE INVENTION

Neutral particle beam (NPB) technology has been developing for some time. A NPB system consists of: (1) a negative ion source; (2) a low energy transport system; (3) a high energy accelerator system; (4) beam optics; (5) a neutralizer; (6) a neutral beam sensing system; and (7) a suitable Acquisition Tracking and Pointing (ATF) system. The particles must have a charge for the accelerator to operate. The ions are given a negative charge because it is much easier to remote the loosely bound extra electron than it is to add an electron to high energy positive ions. There are two primary ways of removing the extra electron from the negative ions. One of the simplest neutralizers is the collisional type, which utilizes a low density gas or a very thin foil to remove the excess electron. This process has two limitations; (1) it introduces divergence system loss of efficiency, and (2) the maximum efficiency of the process is approximately 60%, i.e. 20% remain negative, 20% become positive and 60% are neutralized. If the foil is made thicker, more of the ions are double stripped, and if the foil is made thinner more of the ions are not stripped or neutralized. The effective efficiency of this system is approximately 20 to 30%. The second method of neutralizing high power beams utilizes a high power laser beam. This technique results in high percentage neutralization and a low induced divergence. This process relies on the photons interacting with a loosely bound electron with sufficient energy to eject the electron. The major laser and high mirror reflectivity necessary to confine the photons until they interact with the beam. The weight and power requirements for the laser are presently about the same as the rest of the neutral particle beam platform. This is still potentially of benefit to the overall system since it could result in almost a factor of four increase in the accelerator effective efficiency.

Even with the prior developments, there is still a need for improvements in this area of particle beam neutralization.

Accordingly, it is an object of this invention to provide a non-coherent photon source for neutralizing ions or the particle beam.

Another object of this invention is to provide non-coherent photon neutralization which can yield neutralization efficiency as the laser with only slight increase in beam divergence over an optimized laser neutralizer.

Still another object of this invention is to provide a non-coherent photon neutralization source that has high efficiency photon production with an efficiency as high as 30 to 50%.

Other objects and advantages of this invention will be obvious to those skilled in this art.

SUMMARY OF THE INVENTION

In accordance with this invention, a non-coherent photon neutralizer is provided for removing the negative excess electrons from negative ions to produce a neutral particle beam that can be directed to a target.

DESCRIPTION OF THE PREFERRED EMBODIMENT

Figure 3:
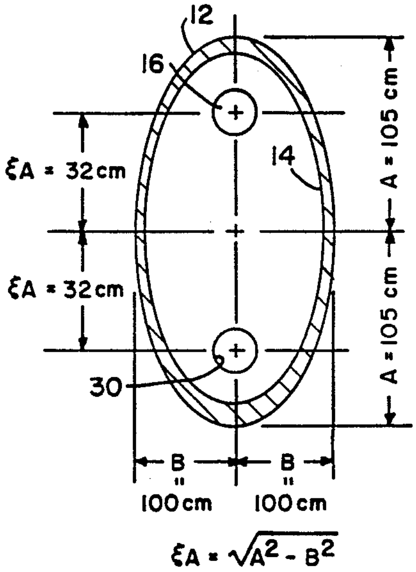
FIG. 3 is a sectional view along line 3—3 of FIG. 2.

Referring now to the drawings, a non-coherent photo neutralizer 10 includes an elongated cylindrical housing 12 that is ellipsoidal in cross section and has an inner reflective surface 14 with a reflectivity of 0.995 that is made of a reflective coating such as Oriel NO. 79770. A fluorescent tube 16 or fluorescent light source is mounted in a conventional manner at one side of the ellipsoidal shaped elongate housing with fluorescent tube 16 mounted at the ellipse focus of the ellipsoidal shape as illustrated in FIG. 3. Also, path 18 for the ion beam is located in the opposite ellipse focus as illustrated in FIG. 3. Housing 12 also has end members 20 and 22 that have internal mirror like reflective surfaces 24 and 26 of a reflectivity of about 0.995 of a material similar to or the same as that for reflective surface 14. End members 20 and 22 have openings 28 and 30 through which the ion beam travels.

Figure 4:
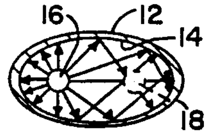
FIG. 4 is a sectional view illustrating reflection of non-coherent light of the reflective elliptical surfaces of the non-coherent photo neutralizer.
Figure 5:
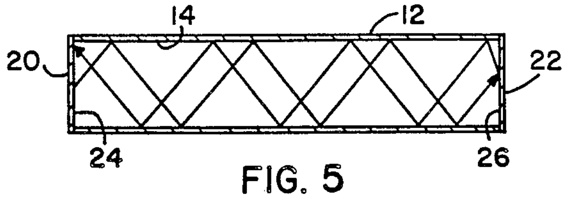
FIG. 5 is a view illustrating reflection of the non-coherent light of reflective mirror end surfaces of the photo neutralizer.

In operation, with light source 16 on and radiating its photons, and with a negative ion beam being propagated through opening 28, through path 18 and out opening 30, the photons from source 16 are sufficiently energetic to neutralize a fraction of the negative ion beam and the photons that do not interact with the negative ion beam transverse the beam and the ellipsoidal reflection cavity with reflective surface 14 reflects the non-interacting photons back through the negative ion beam. This procedure results in an effective gain of the system since many non-interacting photons are recycled into the negative ion beam. The interaction of the reflected photons is illustrated in FIG. 4, and FIG. 5 illustrates how the photons that strike the end members are reflected back and forth in the cylindrical cavity formed by housing structure 12 and end members 20 and 22. In some applications, it may be necessary to cool housing 12 and any conventional type cooling means can be used to cool and dissipate the heat that will accumulate at reflective surfaces 14, 24, and 26.

The efficiency of this invention is driven by:

(1) The brightness of the source, (2) The reflectance of the cavity, and (3) The wavelength of the fluorescent emission. The necessary brightness of the source is most easily discussed in terms of the inband optical thickness, defined as:

$$S(\nu)=\int_0^z \phi_w(\nu)dz \quad (1)$$

where $\phi_w(\nu)$ = Average intensity incident on the beam, and z = Length of the photoneutralizer.

The neutralization fraction is then given by the expression, $$N = 1 - \mathrm{EXP}\left\{ \int_0^\infty - \left[ \frac{\sigma(\nu)}{h\nu} \right]_{\nu-1} S(\nu)d\nu \right\} \quad (2)$$

where $\sigma(\nu)$= Photodetachment cross section of frequency,
$h\nu$= Photon energy at frequency,
$\nu$= Negative ion average velocity, and
$S(\nu)$= In band optical thickness.

The inbend optical power of the source is defined as $$P_o(\nu)=Y_A S(\nu) \quad (3)$$

where $Y_A$ = Width of the negative ion beam.

If it is assumed that the emission function form does not vary with power output, and $g(\nu)$ is the normalized emission spectra of the fluorescent source, then $$P_o=Y_A S_o g(\nu) \quad (4)$$

where $S_o$ =Normalized optical thickness.

In this case the total Power is, $$P_t = Y_a S_o. \quad (5)$$

Therefore, the power necessary to achieve a neutralization of $N_o$, $S_o g(\nu)$ is substituted for $S(\nu)$ in equation (2) And $S_o = N^{-1}(N_o)$ is determined.

Notice this simply allows the computation of the total power requirement assuming no gain caused by reflectance. To include this allow $G(\nu)$ to be the inband cavity gain at frequency $\nu$. Computation of the required power simply changes the form of equation (5) to, $$P_t=Y_A S_o \int_0^\infty [g(\nu)G(\nu)]^{-1} d\nu \quad (6)$$

Consider an excimer $HgCd^w$. Measurements by Mandl indicate that using $[Hg]=5.5\times10^{15}$ $cm^{-3}$, $[Cd]=3\times10^{17}$ $cm^{-3}$ at T= 860° K. results in a conversion efficiency of $\eta(HgCd^w)=0.3$. These results are obtained using a Febetron to excite the gases, $[Ne]=3\times10^{19}$ $cm^{-3}$ as a buffer gas and at a energy loading of 3 J/1. The photoemission obtained is centered at $$\lambda_{HgCd^*}=0.47\mu m, \Delta\lambda=0.07\ \mu m$$

and has an emission time of 3.5 sec. Therefore, [under electron stimulation the photon power is 260 W/cm$^3$. This number represents the power per volume out of the excimer source.

As reported earlier the necessary power out of a photoneutralizing gain is most easily obtained from an elliptical reflecting cavity. Narrowband reflective coatings (e.g. Oriel #79770) produces a reflectivity of 0.995. Wideband reflective coatings with wideangle (−45°) reflectivity of 0.99 (e.g. Oriel #79797) can also be produced. Since, the dominant emission frequencies of $HgCd^w$ are well known, it is possible to provide reflective coatings having both properties. Therefore assume a cavity gain of r=0.995 at a wavelength of 0.47 μm.

For the purpose of this invention, the power density from the source is taken as $p_t$ =260 W cm$^3$ and the reflectivity of the optical cavity is taken as r=0.995, for a photoneutralization wavelength of 0.47 μm. What follows is a reference design of a 10 MeV H− of which 88% is neutralized. The diameter of the beam is taken as 5 cm. This constraint affects the location and size of the fluorescent tube or tubes in the cavity.

Figure 6:
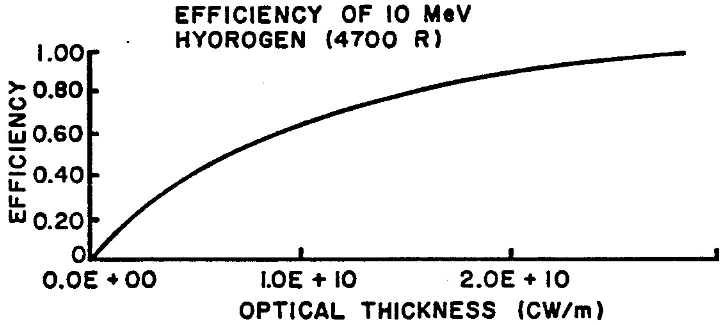
FIG. 6 is a graph illustrating efficiency of the photo neutralizer.

Consider a 10 MeV $H^-$ bean of diameter D=5 cm. From FIG. 6, to obtain a neutralization efficiency of N=0.88 the photoneutralization thickness must be $S_o=200\times10^8$ W/m. The thickness of the source, $Y_A$, is the average width of the optical flux as it illuminates the particle beam. For a laser, this can be set to be the dIameter of the beam. However, for an incoherent source this value is more difficult to calculate. This is because light emanates in all directions from the source and must be focused by the optical cavity through the beam to efficiently use the photons. However, if a simple elliptical cylinder cavity is used $Y_A$ is again the diameter of the particle beam since the optical radiation is focused at the beam. Therefore, $$Y_A=D=5\text{ cm.} \quad (7)$$

Figure 1:
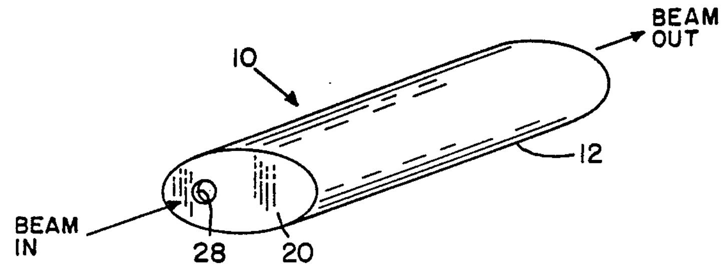
FIG. 1 is a perspective view of a non-coherent photon neutralizer in accordance with this invention.
Figure 2:
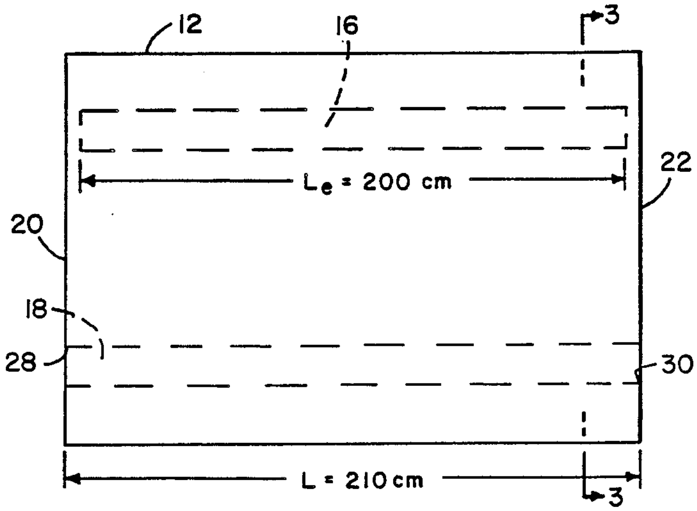
FIG. 2 is a side view of a non-coherent photoneutralizer in accordance with this invention.

FIGS. 1, 2 and 3 show views of the cavity. The source tube is placed on one focus of an ellipse allowing light projected in a direction to be focused through the particle beam placed at the other focus. FIGS. 4 and 5 show views of sample ray traces in the transverse and longitudinal cross-sections. In the transverse cross-section, any ray passing through a focus will be reflected through the other focus. Therefore, every other reflection will result in the ray intersecting the focus where the particle beam is located. Therefore, G, the effective gain of the cavity, can be given by, $$G=\tfrac{1}{2}(1-r). \quad (8)$$

As FIG. 5 shows, the ray also moves longitudinally per reflection. Since the beam is focused transversely to the location of the particle beam, this movement only affects where longitudinally in the cavity the particle beam and the photodetaching photons interact. It therefore has no effect on the effective gain of the cavity. However, for a given reflection site, if the tube is left open, photons can escape from the ends of the cavity. Therefore, a good approximation to the gain of the cavity is given by equation 8.

For this example, since the useful emission frequency is well defined, equation 6 can be modified to, $$P_T=Y_A S_o (1/G\eta). \quad (9)$$

Using equation 7 this becomes, $$P_t=Y_A S_o (\tfrac{1}{2}\eta(1-r)). \quad (10)$$

Using the values defined for 0.88 neutralization efficiency given above yields, $$P_t=4.0\times10^6\text{ W}=4\text{ MW/} \quad (11)$$

Therefore, this is the input power that must initially be fed into the excimer source. Therefore the volume of the source must be, $$V=P_T/(P_t)=1.54\times10^4\text{ cm}^3. \quad (12)$$

The above assumes an elliptical cylinder optical cavity using a fluorescent tube placed at the ellipse focus. Several design constraints have not been considered in the above analysis. Since it is assumed that optical radiation from the source will be focused at the particle beam, the diameter of the emission tube, D, should not exceed the diameter of the beam. Therefore, for the invention $$D_e=D. \quad (—)$$

Further, the diameter of the source centered st a focus, should be much less than the semiminor axis of the ellipse, A. Therefore a constraint of $$B > 20\ D = 100\ \text{cm} \quad (14)$$

is adopted. Further the optical emission tube and particle beam should not intercept. Therefore, to obtain adequate separation along the semimajor axis, A, of the two foci a constraint of, $$A > 6\ D = 30\ \text{cm} \quad (15)$$

This implies a constraint of, $$A > 21\ D = 105\ \text{cm}. \quad (16)$$

Therefore, the elliptical dimensions of the cavity should be 105 cm for the semimajor axis and 100 cm for the semiminor axis. The length of the cavity, L, must be longer than the length of the emission tube, $L_e$. Therefore, $$L > 1.1\ L_e \quad (17)$$

is selected. To obtain the necessary volume given in equation 12 requires, $$(De)^2\ L_e = 25\ L_e > 1.54 \times 10\ \text{cm}^3. \quad (18)$$

Therefore, from equations 17 and 18, $L_e = 200$ cm and L = 220 cm.

We claim:

1. A non-coherent photoneutralizer comprising a housing that is elongated and elliptical in cross-section, said housing having end members that close the elongated structure, internal surfaces of said end members and internal surfaces of said elongated housing being reflective relative to light rays, a fluorescent light source mounted in said elongated body between said end members, and each of said end members having an opening there through with the openings being aligned to allow a ion beam to be projected along a straight line from one end of said elongated housing to the other end of said elongated housing to allow said fluorescent light source to irradiate the ion beam when it is projected through said elongated housing.

2. A non-coherent photoneutralizer as set forth in claim 1, wherein said reflective surfaces have a reflectivity of about 0.995.

3. A non-coherent photoneutralizer as set forth in claim 2, wherein said elongated housing has a shape in cross-section which is elliptical.

4. A non-coherent photoneutralizer as set forth in claim 3, wherein said fluorescent light source is a single fluorescent tube and said fluorescent tube is mounted at one focus of an ellipse of said elliptical shape.

5. A non-coherent photoneutralizer as set forth in claim 4, wherein said openings in said end members are located at another focus of said ellipse of said elliptical shape.

* * * * *

UNITED STATES PATENT AND TRADEMARK OFFICE
CERTIFICATE OF CORRECTION

PATENT NO. : 4,960,990 Page 1 of 2

DATED : October 2, 1990

INVENTOR(S) : Michael J. Lavan; George R. Edlin and Daniel L. Whitener

It is certified that error appears in the above-identified patent and that said Letters Patent are hereby corrected as shown below:

Column 1, line 19, "remote" should read - - remove - -; line 40, after "major" insert - - objections to this technique are high power requirements for the - -; and line 52, "or" should read - - of - -.

Column 3, line 14, "inbend" should read - - inband - -; line 47, the formula should read - - $\lambda_{HgCd}^{*} = 0.47\mu m$ , $\Delta\lambda_{HgCd}^{*} = 0.07\mu m$ - -; and line 67, "10MeVH-" should read -- 10 MeV H-- -.

Column 4, line 52, the "/" (slash) should read - -. - -; and last line "(-)" should read - - (13) - -.

Column 5, line 1, "st" should read - - at - -; and line 26, the formula should read - - $(D_e)^2 L_e = 25 L_e > 1.54 \times 10^4 cm^3$. - -.

UNITED STATES PATENT AND TRADEMARK OFFICE

CERTIFICATE OF CORRECTION

PATENT NO. : 4,960,990

DATED : October 2, 1990

INVENTOR(S) : Michael J. Lavan et al

It is certified that error appears in the above-identified patent and that said Letters Patent is hereby corrected as shown below:

Column 6, line 10, before "ion" insert --negative--; and line 13, before "ion" insert --negative--.

Signed and Sealed this

Tenth Day of March, 1992

*Attest:*

HARRY F. MANBECK, JR.

*Attesting Officer*

*Commissioner of Patents and Trademarks*